Feb. 18, 1969  B. M. ZWART, JR., ET AL  3,428,001
DISPENSER
Filed April 27, 1966

INVENTORS
BERNARDUS M. ZWART, JR.
ALFREDS K. LUKEVICS
HAROLD F. WYLIE
BY
Arthur J. Plantamura
ATTORNEY

INVENTORS
BERNARDUS M. ZWART, JR.
ALFREDS K. LUKEVICS
HAROLD F. WYLIE
BY

ATTORNEY

Feb. 18, 1969  B. M. ZWART, JR., ET AL  3,428,001
DISPENSER

Filed April 27, 1966

INVENTORS
BERNARDUS M. ZWART, JR.
ALFREDS K. LUKEVICS
HAROLD F. WYLIE
BY
Arthur J Plantamura
ATTORNEY United States Patent Office 3,428,001
Patented Feb. 18, 1969

3,428,001
DISPENSER
Bernardus Mulder Zwart, Jr., New Canaan, Alfreds Karlis Lukevics, Stamford, and Harold Franklin Wylie, Redding, Conn., assignors to American Machine & Foundry Company, a corporation of New Jersey
Filed Apr. 27, 1966, Ser. No. 545,690
U.S. Cl. 107—14              9 Claims
Int. Cl. A21c 11/18; A01d 21/02, 25/12

ABSTRACT OF THE DISCLOSURE

An apparatus for automatically extruding a measured increment of material and depositing it at a predetermined station comprising in combination: a carriage support; a traversing extrusion cylinder mounted on said support and movable therewith for holding a supply of material to be extruded and an opening provided at one end of said cylinder through which material to be dispensed is extruded; an extrusion piston housed in said cylinder for urging the material to be dispensed toward said opening; a cut-off element positioned contiguous to said opening to sever extruded increments of said material; drive means for moving said carriage support to traverse said cylinder to and from a dispense station, for advancing said piston and for actuating said cut-off element; and means for coordinating said drive means so that as the cylinder is moved contiguous to a dispense station said piston is advanced and said cut off element is actuated to sever a portion of extruded material.

---

This invention relates to extruding apparatus and more particularly to apparatus which stores a quantity of material, such as food, e.g., cheese, hamburger and/or seasoned chopped meat, bread dough, potato paste composition, and the like, and including other moldable substances from which pre-determined shapes, particularly food patties, may be molded on demand.

In a more specific embodiment the invention relates to an extruder which may be combined with and form a part of a sandwich preparing machine such as that described in the pending U.S. patent application of H. Udall et al., entitled "Food Preparing Apparatus and Method," Ser. No. 220,615, filed Aug. 31, 1962, now U.S. Patent No. 3,266,442 issued Aug. 16, 1966. The apparatus of the invention may be used as an alternate to the mechanism described in the pending U.S. patent application of Tiedeman et al., Ser. No. 467,607, filed June 28, 1965 entitled, "Food Dispenser." In that application a device which cuts a slice from a loaf and transfers the slice, for example to a sandwich, is described. Application Ser. No. 467,607 also refers to application Ser. No. 220,615 which describes a unit capable of completely preparing a sandwich including storage and automatically dispensing, slicing and transfering bread rolls and delivering them in conjunction with ground meat which is fed from bulk, shaped into patties, cooked and then assembled with the bread rolls to form a complete sandwich. Forming of the meat patties may be accomplished by the meat molding apparatus described in the application of Walter W. Behr, Ser. No. 527,363, filed Feb. 14, 1966. The completed sandwich is also automatically wrapped.

The apparatus described in application Ser. No. 220,615, because of its automatic features, may be used in automated restaurant systems of the kind described in conjunction with FIG. 10, for example, which include a centrally located attended control station where orders for food items are received directly or by telephone, or microphone, or from other voice communication devices such as may be found in a drive-in restaurant. Automated food dispensing restaurants of this kind operate through electronic ordering and billing equipment and may include one or more of different food preparing machines, which on demand cook and dispense food items and which are then conveyed and assembled at a central location. An illustrative system of this kind is disclosed, for example, in the N. Alpert et al. pending U.S. application, Ser. No. 219,222, filed Aug. 24, 1962, now U.S. Patent No. 3,267,-436, issued Aug. 16, 1966.

The cheese extruding apparatus of this invention may be used as an independently operable unit, or as a continuous production device. The extruder operates promptly and reliably on demand, and even though a long period, i.e., one or more hours, may elapse since a prior order has been dispensed, the apparatus functions promptly and reliably when called upon to dispense a single or an infinite number of consecutive items. The apparatus is also characterized by its control features, which are sequentially operable and perform a function from a single electrical impulse, which in turn may be received through other functions and thereafter in turn may synchronously trigger later functions occurring, for example, in the machine described in the earlier-mentioned application Ser. No. 220,615.

To summarize in brief, the invention comprises a compact extrusion unit which is capable of automatic operation in its travel from one location to another and in its delivery and deposit of a slice, or portion, extruded from the unit.

While the invention for the purpose of facilitating understanding will be described in connection with its use for depositing portions of extrudable cheese in automatically forming sandwiches, it will be apparent that the apparatus is a separate modular unit and may function as an independent mechanism and for dispensing a variety of compositions other than cheese.

The patty-forming unit of this invention generally comprises a material containing extrusion cylinder equipped with a plunger or piston and a head provided with a slot through which the material is extruded. This assembly is mounted so as to be capable of advancing and retracting, as for example on a carriage, upon each command to deliver a portion.

It is a principal object of the invention to provide an extruder for automatically dispensing substantially uniform portions on command.

It is a more specific object of the invention to provide a piston-actuated cheese extruder which extrudes a uniform portion and transfers the portion to a predetermined station.

It is another object of the invention to provide a novel self-contained apparatus which stores and dispenses on demand measured increments of a sandwich filler composition.

A further object of the invention resides in the provision of an automatic apparatus which forms a part of an automatic restaurant system and which on receiving a demand signal is capable of reliably delivering on station and at a precise time a sandwich filler material.

Other objects and advantages of the invention will become apparent hereafter from a discussion of the invention taken in conjunction with a detailed description of the drawings, wherein.

Figure 1:
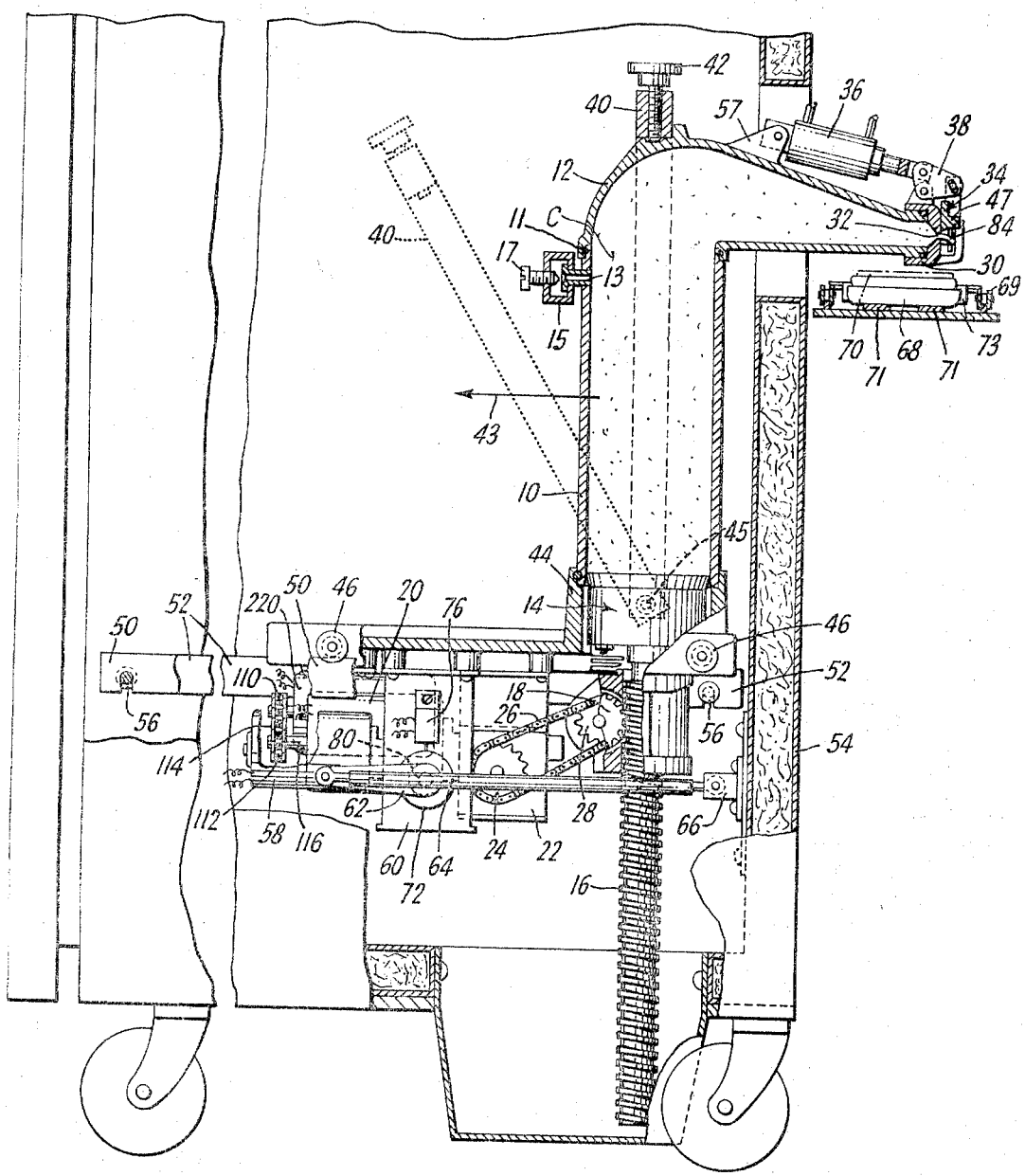
FIG. 1 is a side elevation in section of the extruder showing the general arrangement of the components in the extruding position.
Figure 2:
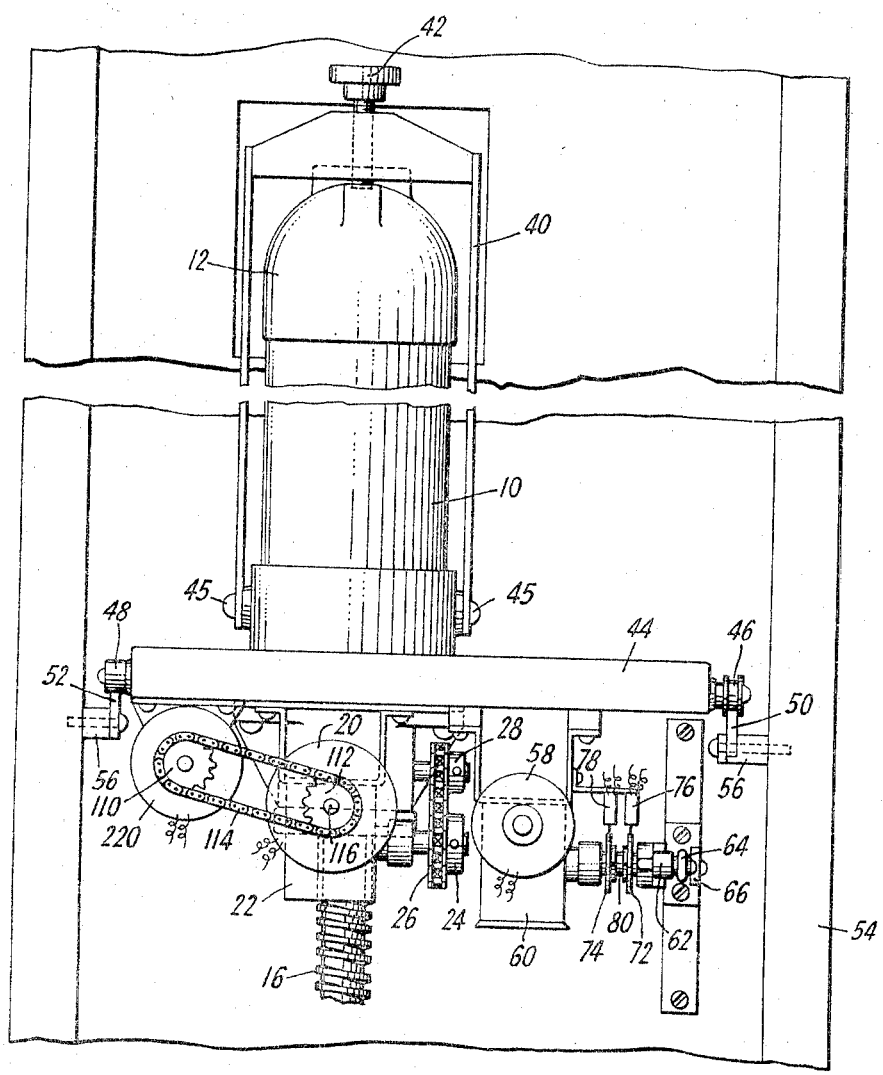
FIG. 2 is a rear elevation illustrating the extruder screw and carriage drive mechanisms.

It is to be noted that the part numbers shown in FIGS. 1 and 2 have been carried forward to the corresponding parts in FIGS. 3 through 9.

Referring now to the drawings and more particularly to FIGS. 1 and 2. The cheese to be extruded is contained in a cylinder 10. The cheese is urged upward into a nozzle 12 by the action of piston assembly 14. The piston assembly is driven by means of a conventional jackscrew 16. The jackscrew 16 meshes with and is propelled by means of an integral worm gear 18. The gear 18, which is supported by a sleeve on jackscrew 16 suitably driven, for example, by an electric motor 20 through a gear reduction box 22, and sprocket 24, endless chain 26 and drive sprocket 28, which is stationarily fixed to one lateral surface of worm gear 18.

Mounted on the free end of the extruder head or nozzle 12 is a cap 30. The cap 30 is provided with an appropriate extrusion slot 32 as well as with a movable knife 34 to sever the cheese at the mouth 55 of the slot while simultaneously sealing the slot at the end of an extruding cycle. Knife 34 is appropriately actuated by an air cylinder 36 which is operated in synchronous timed relation with the extrusion cycle, through a linkage 38 interconnecting knife 34 and cylinder 36. Air cylinder 36 is mounted on the top of nozzle 12 and between a pair of lugs 57 which may be integrally formed in the nozzle.

The cap 30 is appropriately retained on the nozzle 12 such as by means of a pair of pins 29 which pass through matching holes in the nozzle 12 and cap 30. The joint between the cap 30 and nozzle 12 is preferably suitably sealed with an O ring 31. The knife 34 is held against the surface of the cap 30 by means of two pressure pads 33 which in turn are held against the knife 34 by means of springs 35 (see FIG. 8).

The cylinder 10 and nozzle 12 form a goose neck-like structure and are conveniently coupled and firmly restrained against the extrusion forces by means of a yoke 40. A hand screw 42 is suitably employed to secure the yoke. The yoke 40 is pivotally mounted on pins 45 secured to an extension on carriage 44.

The joint between the cylinder 10 and the nozzle 12 is also sealed by an O ring 11.

The carriage 44 functions as a mount for jackscrew 16 and its drive mechanism previously described as well as providing the means by which extension material is deposited.

Carriage 44 is equipped with two pairs of rollers 46 and 48 which ride on rails 50 and 52. The rails are suitably mounted on the walls of a refrigerator enclosure 54 by use of wall projections or standoffs 56.

As the cheese under pressure from piston 14 through jackscrew 16 emerges as a ribbon 84 from the slot 32 the carriage 44 starts its return motion toward the left as indicated by arrow 43 shown in FIG. 1. The carriage travel speed and cheese extrusion rate are so adjusted that the desired portion of cheese will have been dispensed as the extrusion slot 32 passes the depositing station, i.e., approximately over the left edge of the sandwich 68. At this point the extrusion motor 20 is stopped and the air cylinder 36 is reversed moving the knife 34 downward thereby severing the extruded cheese and closing the extrusion slot 32. The severed cheese portion thereby drops into position 70 on sandwich 68 while the carriage 44 continues to the left until the cap 30 has been withdrawn into the refrigerated enclosure 54. The carriage 44 dwells in this position until a command for another cheese portion is received.

In resupplying the extruder cylinder. When the piston assembly 14 reaches a point near the top of the cylinder 10 the dispenser refill is indicated. To reload the dispenser the piston assembly 14 is retracted to the bottom of its stroke, as shown in FIG. 1, allowing maximum refill space. The requirements of one application of this invention are such that the instantaneous velocity of the piston 14 as cheese is being extruded is on order of 2 inches per minute. For example, in a dispenser with a cylinder 10 of 12 to 14 inches, the length the time to retract the piston assembly 14 for purposes of reloading would be on the order of 6 to 7 minutes. This elapse of time during reloading may be objectionable in some applications. For this reason it may be desirable to run the retract movement of the jackscrew 16 at a relatively rapid rate.

Referring to FIGS. 1 and 2 motor 220 is connected by means of sprockets 110 and 112 and chain 114 to an extension 116 of the armature shaft of motor 20 in such a way that, when motor 220 is energized, motor 20 is driven in reverse at approximately four times its normal forward speed. As motor 20 is always connected to the jackscrew 16 as previously explained the effect of the high speed reversal of motor 20 is to run the jackscrew 16 and attached piston assembly 14 downward at about four times their upward speed with a consequential abbreviated reloading time. As will appear in the discussion of FIG. 9, controls are so interlocked as to prevent electric power from being applied simultaneously to motor 20 and motor 220. To complete reloading the hand screw 42 is loosened and the yoke 40 is swung away to a position shown in phantom in FIG. 1. The nozzle 12, together with those parts (cap 30, knife 34, air cylinder 36, and bell crank 38) attached is removed and laid aside. Commercially available cheese of any appropriate form and plasticity (i.e., a loaf or block) is then placed in the cylinder 10, the nozzle 12 is replaced, the yoke 40 is positioned, and the handscrew 42 tightened.

Figure 6:
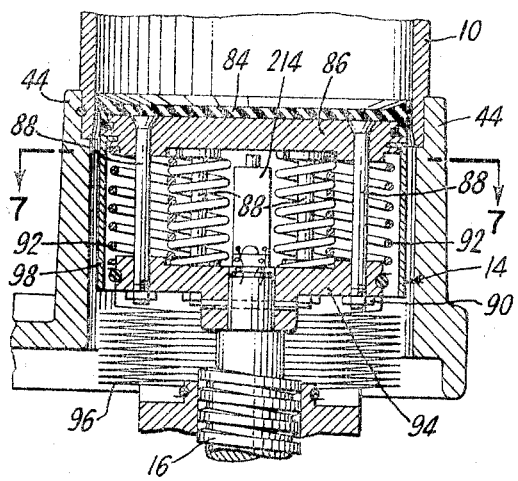
FIG. 6 is an enlarged fragmentary sectional view of the piston assembly illustrating details of its component parts.
Figure 7:
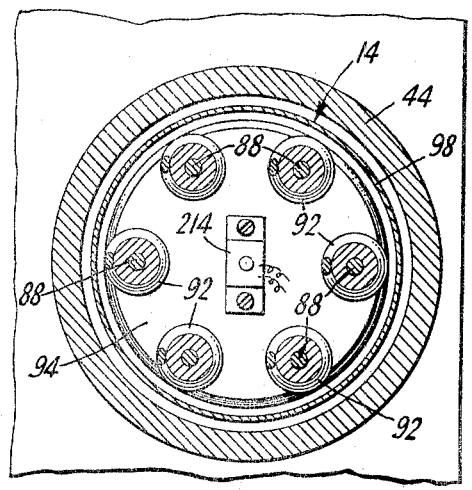
FIG. 7 is a sectional plan view taken along line 7—7 of FIGURE 6 showing the arrangement of the piston assembly compression springs.

It has been found that the cheese in the cylinder 10 and nozzle 12 must be under a pressure on the order of a few hundred pounds per square inch in order to achieve a satisfactory rate of extrusion through the slot 32. To assure proper size of the first portion of cheese dispensed after loading or reloading the dispenser it is preferable to preload or compress the cheese before placing the dispenser in service. Referring to FIGS. 6 and 7 it may be seen that the force of the jackscrew 16 is transmitted to the cheese by means of the flange 94, compression springs 92, piston 86, and cup seal 84. The cup seal 84 may be formed of a suitable material e.g., an elastomer such as rubber and is preferably designed so that on the upward stroke of the piston assembly 14 an effective seal is formed with the inner wall of the cylinder 10. During the downward travel of the piston assembly 14, air will pass between the cup seal 84 and the inner wall of the cylinder 12 preventing the formation of a vacuum in cylinder 10 above the cup seal 84.

The springs 92 are held in position by bolts 88 which pass through the flange 94 and are secured by nuts 90. The preload limit switch 214 is mounted on the flange 94 so that its actuator is in close proximity to the underside of the piston 86. The cup seal 84, piston 86, switch 214, springs 92, bolts 88 and nuts 90 together with a protective skirt 98 comprise the arrangement heretofore referred to as the piston assembly 14.

To apply the desired preload, i.e., to ready the extruder for dispensing a portion on command, motor 20 is energized which in turn causes the jackscrew and attached piston assembly 14 to drive the newly loaded cheese supply upward.

As the cheese is driven upward it encounters either the closed knife 34 over the extrusion slot 32 or alternately if a residual supply remains from a prior charge, residual cheese in the nozzle 12. In either case the cheese is prevented from moving and further upward travel of the piston assmbly 14 results in compression (or preload) in the cheese. When this compression reaches a predetermined value the springs 92 compress allowing the piston 86 to move downward relative to the jackscrew flange 94 thus actuating the normally closed preload switch 214 and stopping the motor 20. The dispenser is now ready to be returned to service.

The preferred form of the cheese to be used in this dispenser is a round cylindrical loaf with a diameter slightly smaller (to facilitate loading) than the inner diameter of the cylinder 10. As cheese of this configuration may not always be available other shapes must sometimes be used. One such shape is the common five-pound loaf which is about 3½″ square and 11″ long. When this loaf is placed in the round cylinder 10 about 45 percent of the volume of the cylinder 10 is occupied by air.

During preloading or shaping of the new supply to the cylindrical container, this air becomes trapped and mixes with the cheese. This trapped air is then dispensed along with the cheese causing imperfections in the ribbon 84 and variations in the portion size. For this purpose, a vent 13 see FIG. 1, has been provided which substantially eliminates this trapped air. A screw 17 held in clamp 15 is used to close the vent.

During the preloading of the cheese the vent 13 is opened by loosening screw 17. As the preload force is applied the cheese deforms to fill the cylinder 10 forcing the trapped air out through the vent 13. With a properly sized and located vent the desired preload will be obtained before any significant quantity of cheese is forced out. When the desired preload has been obtained the vent is closed by tightening screw 7.

Figure 4:
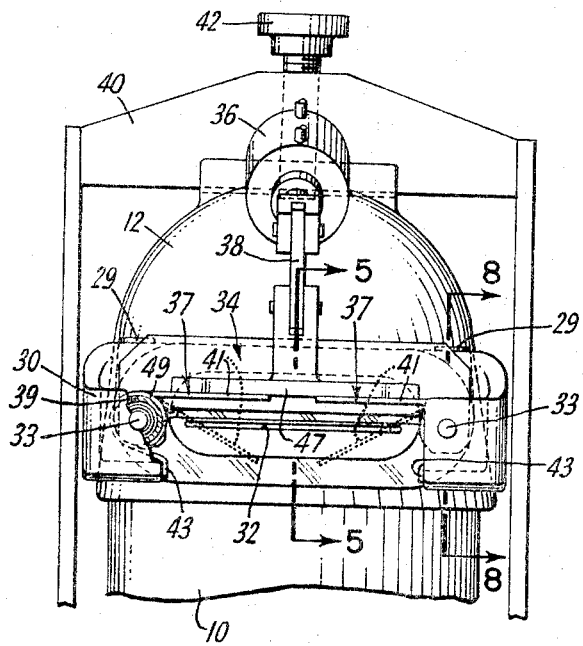
FIG. 4 is an enlarged fragmentary front view of the upper portion of the extruder and illustrating in better detail the extrusion slot and the knife.
Figure 5:
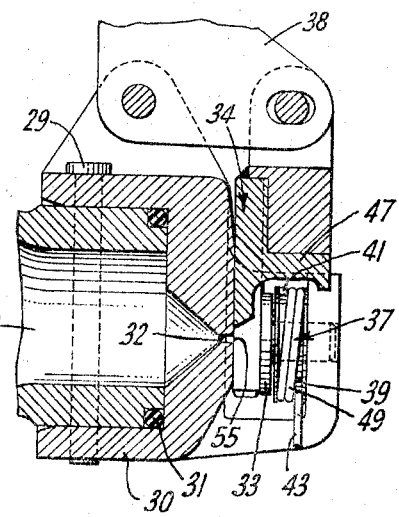
FIG. 5 is an enlarged fragmentary sectional view of the extruder nozzle taken along line 5—5 of FIGURE 4.
Figure 8:
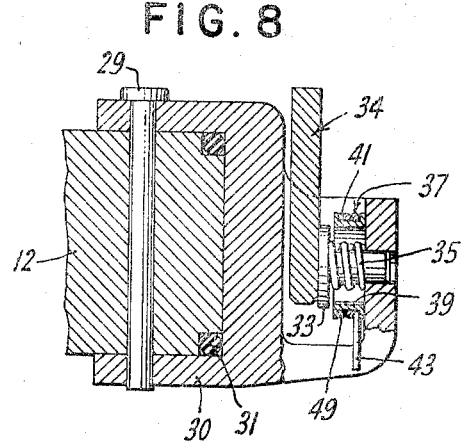
FIG. 8 is a detail sectional elevation taken along line 8—8 of FIGURE 4.

Because some types of cheese are relatively sticky in nature and tend to cling to the knife 34 after the portion of ribbon 84 is severed, means to assure separation are provided. Referring to FIGS. 4, 5 and 8, a pair of fingers 37 are provided. A portion of each finger 37 is formed as a torsion spring 49. The fingers are mounted on sleeves 39 which are placed over the pressure pads 33 before the knife 34 is assembled to the cap 30. The purpose of the sleeve is to prevent the torsion spring turns in finger 37 from becoming entangled in the turns of spring 35. One end of each finger 37 abuts the cap 30 at point 43 as shown in FIGS. 4, 5 and 8. The straight portion 41 of each finger is placed under a horizontal projection 47 on the knife 34 so that when the knife is closed the straight portion 41 of the finger 37 takes the position shown in dotted lines in FIG. 4. When the knife 34 is raised to permit extrusion of cheese torsion in the torsion springs 49 causes the straight portion 41 of each finger 37 to move to a horizontal position just above the extrusion slot 32. As the knife 34 moves down to sever the dispensed cheese ribbon the straight portion 41 of each finger 37 also is moved downward striking the severed portion of cheese thus overcoming any tendency of the cheese to stick to the knife.

While the foregoing description has related to an embodiment of this invention to dispense cheese it will be understood that the invention may be applied as well to dispense any reasonably homogeneous semi-solid, for instance, creamery butter, peanut butter, jelly, ham spread, and the like, as well as non-food compositions.

Figure 9:
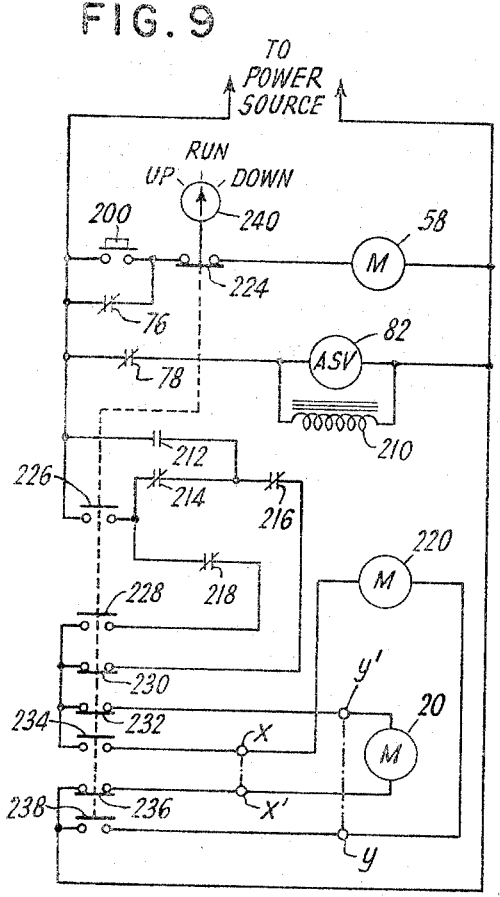
FIG. 9 is a schematic wiring diagram of an electrical control circuit which may be adapted to implement the automatic operation of the extruder of the invention.

Referring to the circuit diagram of FIG. 9, a three position rotary selector switch consisting of an actuator 240 and contacts 224, 226, 228, 230, 232, 234, 236, and 238 may be used to control the operation of the cheese dispenser. The contacts 224 through 238 are mechanically connected to the actuator 240 as indicated by the dashed line. FIG. 9 shows the means for regulating motors 20, 220 and air cylinder 36 and for coordinating the operation of carriage 44, piston 14 and knife 34.

When push button 200 is momentarily depressed a circuit is completed to the traverse motor 58 through selector switch contact 224. As the motor 58 starts cam 72 attached to its output shaft 80 closes switch 76 completing a parallel circuit around push button 200. This assures that the output shaft of the traverse motor will make exactly one revolution per dispensing cycle and then stop. Motor 58 has a gear box portion 60, which supports and drives shaft 80. Shaft 80 has an eccentric portion 62, which is pivotally connected to one end of an elongate rod 64. Rod 64 is connected at its other end to a bracket 66 mounted on refrigerator 54. With this construction, carriage 44 is moved toward and away from bracket 66 and cap 30 is moved relative to sandwich 68 during the revolution of shaft 80 in the dispensing cycle.

As the output shaft of the traverse motor continues to turn a second cam 74 also mounted on the shaft 80, actuates switch 78 completing a circuit to the four-way solenoid valve 82 and relay coil 210. When this circuit is completed the four-way solenoid admits air pressure to the air cylinder 36 which in turn causes the knife 34 to expose the extrusion slot 32 as previously explained.

Simultaneously with the operation of the four-way solenoid valve 82 relay contact 212 associated with relay coil 210 closes completing the circuit to the jackscrew drive motor 20 through normally closed limit switch 216 and selector switch contacts 230, 232 and 236. Motor 20 advances the piston assembly 14 forcing a ribbon of cheese 84 to flow through the extrusion slot 32.

Cam 74 is so proportioned and adjusted that it releases switch 78 when the desired amount of cheese has been dispensed. Releasing switch 78 opens the circuit to relay coil 210 which in turn opens its associated contact 212 stopping the jackscrew drive motor. Releasing switch 78 also de-energizes the four-way solenoid valve 82 reversing the air pressure to air cylinder 36 which pushes the knife 34 down to sever the ribbon 84 and cover the extrusion slot 32.

As the piston assembly 14 nears the top of the cylinder 10 limit switch 216 is actuated opening the circuit to motor 20 preventing any further upward travel of the piston assembly 14. At this point, the dispenser must be reloaded.

To reload the dispenser, the selector 240 is placed in the "down" position. This action opens contacts 224, 230, 232, and 236, disabling traverse motor 58 and dispense motor 20, and closes contacts 226, 228, 234 and 238. Closure of these contacts completes a circuit to the retract motor 220 through limit switch 218 and drives the piston assembly downward at high speed when a new charge is to be introduced.

Should the high speed retract feature not be warranted motor 220 can be removed by disconnecting at points x and y. Points x and y are then connected to points x′ and y′ respectively as shown by dot-dash lines. Motor 20 will now operate reversibly to drive the piston assembly 14 up or down depending on the setting of selector 240. This explanation assumes that motor 20 is reversible by simply reversing electrical polarity. While this assumption is not valid for all electric motors, methods for electrically reversing motors by use of a double-pole double-throw switch are well known in the art and need not be expounded here. Contacts 232, 234, and 236 and 238 provide the same function as a double-pole double-throw switch.

The method of loading cheese and the need for preloading have already been discussed. Electrically, the pre-load is achieved as follows: After filling the dispenser with cheese and locking the yoke assembly 40 the selector switch is placed in the "Up" position opening contacts 224, 228, 234 and 238 disabling the traverse motor 58 and the retract motor 220. Placing the selector in the "Up" position also closes contacts 226, 230, 232 and 236 completing the circuit to the dispense motor 20 thus driving the piston assembly 14 up. When the predetermined preload is achieved the switch 214, as mentioned earlier, will open, stopping the motor 20. The dispenser can then be returned to service by moving the selector 240 to the "run" position.

As noted hereinabove, the apparatus of the invention has the additional advantageous capability of being, and preferably is, used in conjunction with an automatic hamburger machine which in turn may be incorporated into an automated system which prepares and dispenses a variety of food items ready for consumption by a customer.

Systems of this kind may be remotely actuated and comprise a centrally located attended control station where orders for food items are received at the control station either directly or remotely by telephones connected to dining areas or by other voice communication means such as a microphone at a drive-in station of an automobile parking area, and where, through electronic ordering and billing equipment, a plurality of different food preparation machines are commanded to simultaneously or individually cook or otherwise process and dispense food items.

Figure 10:
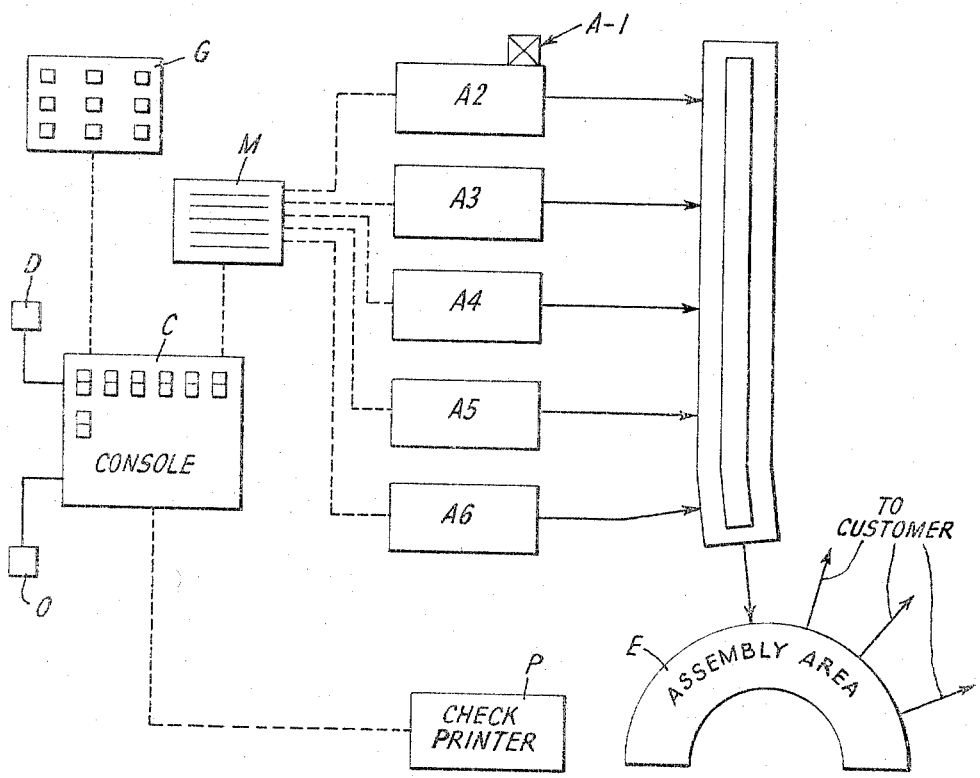
FIG. 10 is a schematic representation of an automated restaurant system of the kind which may usefully incorporate the apparatus of the invention.

In the arrangement shown in FIG. 10, the nozzle 12 of the cheese dispenser A–1 is shown schematically coupled to a conveyor portion 71 of a hamburger machine A–2 such as the one disclosed in U.S. Patent 3,266,442 of Aug. 16, 1966 and entitled Food Preparing Apparatus. The above combination is installed in conjunction with other automatic machines A–3 through A–6, examples of which may be the entree dispensing machine disclosed in U.S. Patent 3,369,479 of Feb. 20, 1968 and entitled "Storage Dispensing and Cooking System"; the frankfurter and bun dispensing and cooking machine disclosed in U.S. Patent 3,384,497 of May 21, 1968 and entitled "Automatic Cooking Machine"; the food frying machine disclosed in U.S. Patent 3,347,152, of Oct. 17, 1967 and entitled "Automated Fryer"; the beverage dispensing machine described in U.S. Patent 3,364,959 of Jan. 23, 1968 and entitled "Beverage Dispenser"; and the like.

The system depicted in FIG. 10 synchronizes the electronic control system with the food preparing machines and functions generally in the following manner:

Orders from outside sources, such as a dining room D and an outside drive-in parking lot O, are received by an attendant generally through remote voice communication at console C. The attendant enters the order into the console C and thereby actuates the food preparing machines and the printer P which prints out a check. The printer P is preferably conveniently situated contiguous to the assembly area E where the prepared food orders are assembled. When keys of the console C are actuated to provide the necessary impulses to initiate operation of the respective automatic food processing machines, this actuation simultaneously enters the food orders through the memory storing means M for the appropriate machine A–2 through A–6, respectively. The memory unit serves to rapidly accept and store (or backlog) a quantity of orders and feeds the orders individually into the machines when the machine is capable of accepting an order. As the order is accepted by the machine, the backlog stored in the memory is automatically reduced correspondingly by the order in process. This process continues automatically until all stored orders are depleted. A bank of electric order counters G records and provides a readout of the number of orders passing through each machine to aid in inventory and food replenishment schedules for the machines. The order and billing system likewise totals the amount of billings.

After the order, processed by the machine, is delivered to the assembly area E and assembled with its corresponding printed check, it is delivered by an attendant, e.g., a waitress or car-hop to the ordering customer. Greater details of a suitable electronic billing and ordering system, useful in conjunction with the invention, are provided in U.S. Patent 3,267,436 of Aug. 16, 1966 and entitled "Electronic Ordering, Price Computing and Billing System."

Figure 3:
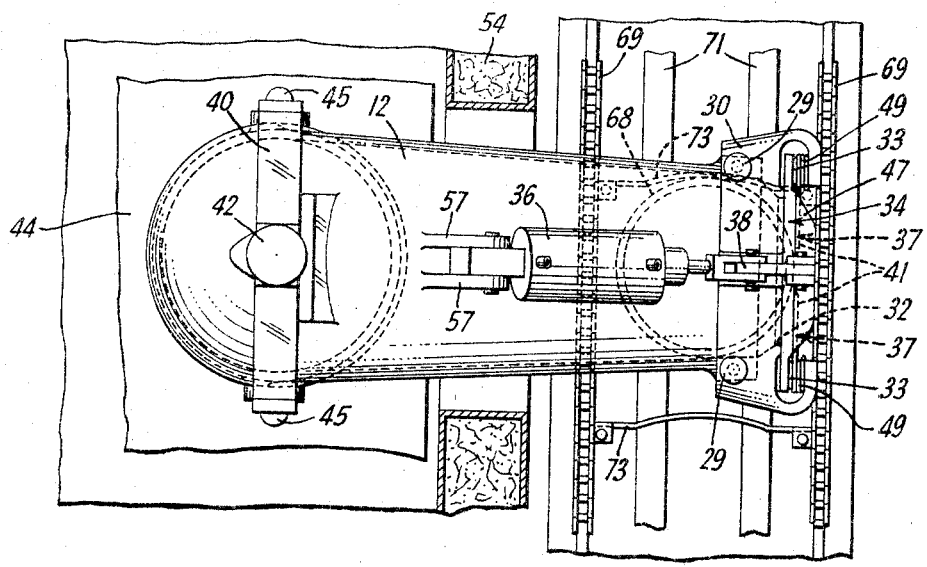
FIG. 3 is a plan view of the extruding apparatus.

An illustration of the manner in which the extruders of this invention is assimilated into a system of the kind shown in FIG. 10 is considered by reference to FIGS. 1 and 3 of the drawings. Sandwich 68 which is to receive the cheese portion 70 is carried by the cheese dispenser on a conveyor. A typical conveyor consists of sliding surfaces 71, side chains 69 and flights 73 connected to the side chains 69. As the chains 69 are driven the flights 73 push the sandwich 68 along the sliding surfaces 71. The conveyor is so programmed and synchronized that the sandwich 68 dwells beneath the cheese dispenser momentarily while the cheese portion 70 is deposited. After the cheese portion has been deposited the conveyor indexes moving the previous sandwich away and bringing a new sandwich on station to receive a portion.

It will be apparent to those skilled in the art that various modifications may be made herein, without departing from the scope of the invention. Accordingly, the invention is not to be limited except insofar as required by the appended claims.

We claim:
1. An apparatus for automatically extruding a measured increment of material and depositing it at a predetermined station comprising in combination:
   a carriage support;
   a traversing extrusion cylinder mounted on said support and movable therewith for holding a supply of material to be extruded and an opening provided at one end of said cylinder through which material to be dispensed is extruded;
   an extrusion piston housed in said cylinder for urging the material to be dispensed toward said opening;
   a cut-off element positioned contiguous to said opening to sever extruded increments of said material;
   drive means for moving said carriage support to traverse said cylinder to and from a dispense station, for advancing said piston and for actuating said cut-off element; and
   means for coordinating said drive means so that as the cylinder is moved contiguous to a dispense station said piston is advanced and said cut-off element is actuated to sever a portion of extruded material,
   wherein said coordinating means are arranged so that the advance of the piston is interrupted and said cut-off element is actuated to sever an extruded portion, as said carriage is being retracted from the dispense station.

2. An apparatus for automatically extruding a measured increment of material and depositing it at a predetermined station comprising in combination:
   a carriage support;
   a traversing extrusion cylinder mounted on said support and movable therewith for holding a supply of material to be extruded and an opening provided at one end of said cylinder through which material to be dispensed is extruded;
   an extrusion piston housed in said cylinder for urging the material to be dispensed toward said opening;
   a cut-off element positioned contiguous to said opening to sever extruded increments of said material;
   drive means for moving said carriage support to traverse said cylinder to and from a dispense station, for advancing said piston and for actuating said cut-off element;
   means for coordinating said drive means so that as the cylinder is moved contiguous to a dispense station said piston is advanced and said cut-off element is actuated to sever a portion of extruded material,
   further provided with a refrigerator compartment for said carriage support and into which said cylinder is retracted after each traverse from said dispense station.

3. The apparatus of claim 1, further provided with a second and relatively rapid drive means for retracting said piston.

4. The apparatus of claim 1, further provided with a vent disposed near the extruding opening of said cylinder.

5. An apparatus for automatically extruding a measured increment of material and depositing it at a predetermined station comprising in combination:
   a carriage support;
   a traversing extrusion cylinder mounted on said support and movable therewith for holding a supply of material to be extruded and an opening provided at one end of said cylinder through which material to be dispensed is extruded;
   an extrusion piston housed in said cylinder for urging the material to be dispensed toward said opening;
   a cut-off element positioned contiguous to said opening to sever extruded increments of said material;
   drive means for moving said carriage support to traverse said cylinder to and from a dispense station, for advancing said piston and for actuating said cut-off element;
   means for coordinating said drive means so that as the cylinder is moved contiguous to a dispense station said piston is advanced and said cut-off element is actuated to sever a portion of extruded material, further provided with a preload limit switch on said piston to interrupt further advance of said piston after a predetermined pressure on the piston is attained.

6. The apparatus of claim 1 further provided with a severed portion engaging element which is actuated by said cut-off element so that as the cut-off element severs a portion, said portion is separated by said engaging element.

7. The apparatus of claim 1, in combination with a remote order signal generating and order memory storing means which accepts consecutive orders and relays such orders individually and wherein said apparatus is electrically connected to and is responsive to said signal means.

8. An extruder of a cheese-like material comprising:
   an outer body having walls forming a cavity;
   a piston disposed in said cavity and movable relative to said outer body and forming a variable-volume chamber between said outer body and said piston;
   passage means extending through one of said outer body walls and opening into said chamber;
   valve means mounted on said outer body and disposed adjacent to said passage;
   a cylinder-pressurizing means including a plurality of compression spring and a cap seal forming one face of the piston and engaging the cheese disposed in said chamber and movable relative to said outer body and said piston for maintaining pressure in said chamber and means for actuating said piston and said valve.

9. The extruder as claimed in claim 8, in which said valve means comprises a plate movable relative to said outer body and means for actuating said plate, said plate having a cutting edge disposed in said passage and movable transverse to said passage.

References Cited

UNITED STATES PATENTS

| | | | |
|---|---|---|---|
| 461,630 | 10/1891 | Geyer | 107—14 |
| 1,255,813 | 2/1918 | Brew. | |
| 1,594,378 | 8/1926 | Prout | 107—14 |
| 2,055,398 | 9/1936 | Alloo | 107—1 |
| 2,626,575 | 1/1953 | Whitsel | 107—1 |
| 3,266,442 | 8/1966 | Udall et al. | 107—1 |

WALTER A. SCHEEL, *Primary Examiner.*

JOSEPH SHEA, *Assistant Examiner.*

U.S. Cl. X.R.

17—32; 18—12; 31—14; 222—146; 107—1